July 30, 1935.                    R. E. BURK                    2,009,954
TREATMENT OF LIGHT PETROLEUM DISTILLATES
Filed Sept. 2, 1933
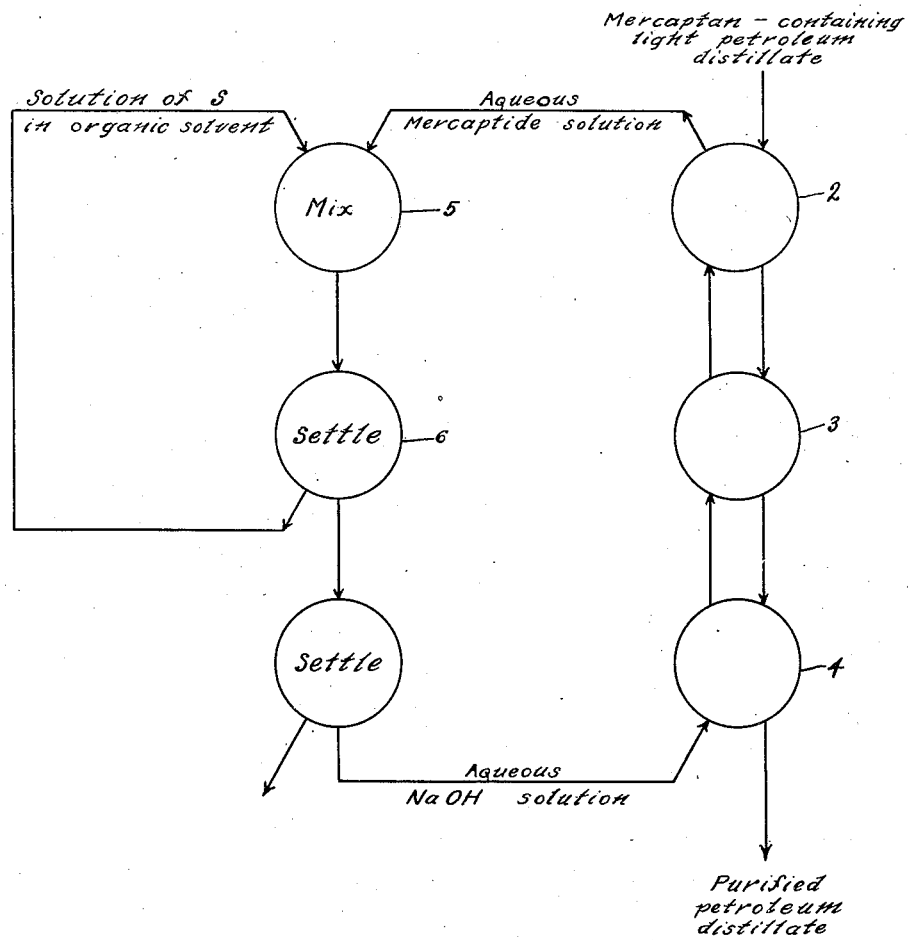
INVENTOR.
Robert E. Burk
BY
Bay, Oberlin & Bay
ATTORNEYS.

Patented July 30, 1935

2,009,954

UNITED STATES PATENT OFFICE 2,009,954

TREATMENT OF LIGHT PETROLEUM DISTILLATES

Robert E. Burk, Cleveland, Ohio, assignor to The Standard Oil Company, Cleveland, Ohio, a corporation of Ohio Application September 2, 1933, Serial No. 688,075

3 Claims. (Cl. 196—32)

This invention relates to the treatment of light petroleum distillates, and more particularly the purifying of such distillates containing sulphur; and it is among the objects of the invention to provide a process which is highly desirable in action, and which allows of convenient control, and economy of materials. Other objects and advantages will appear as the description proceeds.

To the accomplishment of the foregoing and related ends, the invention, then, comprises the features hereinafter fully described, and particularly pointed out in the claims, the following description and the annexed drawing setting forth in detail an illustrative embodiment of the invention, this being indicative however, of but one of the various ways in which the principle of the invention may be employed.

In said annexed drawing:—

The sole figure is a schematic illustration on the order of a flow sheet, showing an embodiment of the invention.

The light petroleum distillate, such as gasoline, kerosene, etc., containing sulphur, as in the form of mercaptans, is subjected to the action of aqueous sodium hydroxide solution. Mercaptans are converted into sodium mercaptides thereby. Desirably, the distillate is brought into contact with the sodium hydroxide solution in counter-current flow arrangement, as for instance a series of tower-like chambers which allow of thorough mixing and then separation such that the petroleum distillate may be drawn off at one point, and the aqueous solution of the alkali at another point, and the finally completed distillate product be removed from the system at a point of discharge, while the aqueous treating solution is recycled back to treat further on-coming distillate. The sodium hydroxide solution in the course of time, depending upon the extent of mercaptan-impurities in the distillate being treated, becomes loaded up with sodium mercaptides, but in accordance with the present process, this is obviated and the treating solution is maintained sufficiently free from mercaptide accumulation to operate in continuous manner with the on-coming distillate. For this purpose, in a suitable point of the cycle, the aqueous soda solution carrying the mercaptides picked up from the treatment of the distillate, is washed with a solution of sulphur carried by a suitable solvent, such that the sulphur solution can be adequately separated from the aqueous sodium hydroxide solution. As convenient solvents for the sulphur, organic liquids such as benzol, petroleum distillates, particularly naphtha, may be employed, and the sulphur solution therein may be substantially a saturated solution. In the treatment of the mercaptan-containing petroleum distillate with the sodium hydroxide solution, the general type of reaction occurring may be illustrated by the equation $NaOH + HSR = NaSR + H_2O$. The NaSR is of course formed in minor proportion, such as to constitute an accumulating impurity in the NaOH solution. When the NaOH solution thus containing mercaptide is subjected to the action of the solution of sulphur, the mercaptide content of the sodium hydroxide solution is changed into compounds on the order of disulphides, as illustrated generally by the equation $2NaSR + S = R-S-S-R + Na_2S$, although other complicating reactions also occur. With a suitable organic solvent as the carrier for the sulphur, a double function may be realized at this point, in that the sulphur may be carried out by the same solvent. A cleaning or regenerating of the sodium hydroxide solution may thus be carried on continuously, while circulating in its cycle. New sulphur solution may be provided when necessary, the old solution being taken off in whole or in part at convenience. The $Na_2S$ which stays in solution in the caustic soda may be separated out if desired in a settling tank, depending upon the concentration of the sodium hydroxide solution. Its presence does no harm except to increase the sulphur consumption through the formation of water-soluble inorganic polysulphides of sodium. The aqueous caustic solution as recycled to treat the petroleum distillate however contains enough free sulphur from the polysulphides to sweeten the distillate being finshed. Even if an excess of free sulphur should be thus presented to the distillate being finished, it would do no harm, if the distillate is not so cracked as to go unstable in gum and color.

The sodium hydroxide solution m y be of desired or convenient strength, for instance somewhere in the neighborhood of 7 per cent.

As an example: A mercaptan-containing gasoline is washed with an aqueous solution of sodium hydroxide of about seven per cent, the gasoline and the alkali solution being passed counter-currently to each other through suitable chambers 2, 3, 4, allowing adequate mixing and then layer-separation and off-flow in succession, the washed gasoline being taken off from the last of the series, while the caustic solution is taken off from the first of the series, and is then brought into thorough admixture in a suitable chamber 5 with about an equal volume of a nearly saturated solution of sulphur in petroleum naphtha. The liquid mixture is then passed on to a settling chamber 6 where the naphtha-sulphur solution is drawn off and recycled back to the mixing chamber, while the aqueous solution of sodium hydroxide is passed on and recycled to the series of gasoline-treating chambers, 4, 3, 2, an intermediate filtration or settling or cooling being carried out if desired.

It is thus seen that sulphur compounds, such as mercaptans, may be removed from gasoline and the like, in a highly advantageous manner, while the caustic soda solution so employed may be progressively kept clear of undesired mercaptide accumulation by treatment also operable on a cycling basis.

Other modes of applying the principle of the invention may be employed, change being made as regards the details described, provided the features stated in any of the following claims, or the equivalent of such, be employed.

I therefore particularly point out and distinctly claim as my invention:—

1. A process of purifying light petroleum distillates, which comprises mixing the distillate with an aqueous solution of sodium hydroxide, separating the distillate from the sodium hydroxide solution, mixing said separated sodium hydroxide solution with a hydrocarbon solution of sulphur in the absence of the distillate, separating the sodium hydroxide solution and the sulphur solution, and mixing the separated sodium hydroxide solution with petroleum distillate.

2. A process of purifying light petroleum distillates, which comprises mixing the distillate with an aqueous solution of sodium hydroxide in counter-current flow, separating the distillate from the sodium hydroxide solution, mixing said separated sodium hydroxide solution with a hydrocarbon solution of sulphur in the absence of the distillate, separating the sodium hydroxide solution and the sulphur solution, and flowing the sodium sydroxide solution back in counter-current mixing with petroleum distillate.

3. A process of purifying light petroleum distillates, which comprises mixing the distillate with a 7 per cent aqueous solution of sodium hydroxide in counter-current flow, separating the distillate from the sodium hydroxide solution, mixing said separated sodium hydroxide solution with a hydrocarbon solution of sulphur in the absence of the distillate, separating the sodium hydroxide solution and the sulphur solution, and flowing the sodium hydroxide solution back in counter-current mixing with petroleum distillate.

ROBERT E. BURK.